July 5, 1960     A. L. CROSBY ET AL     2,943,723
TUBE-ORIENTATOR
Filed April 21, 1958     5 Sheets-Sheet 1
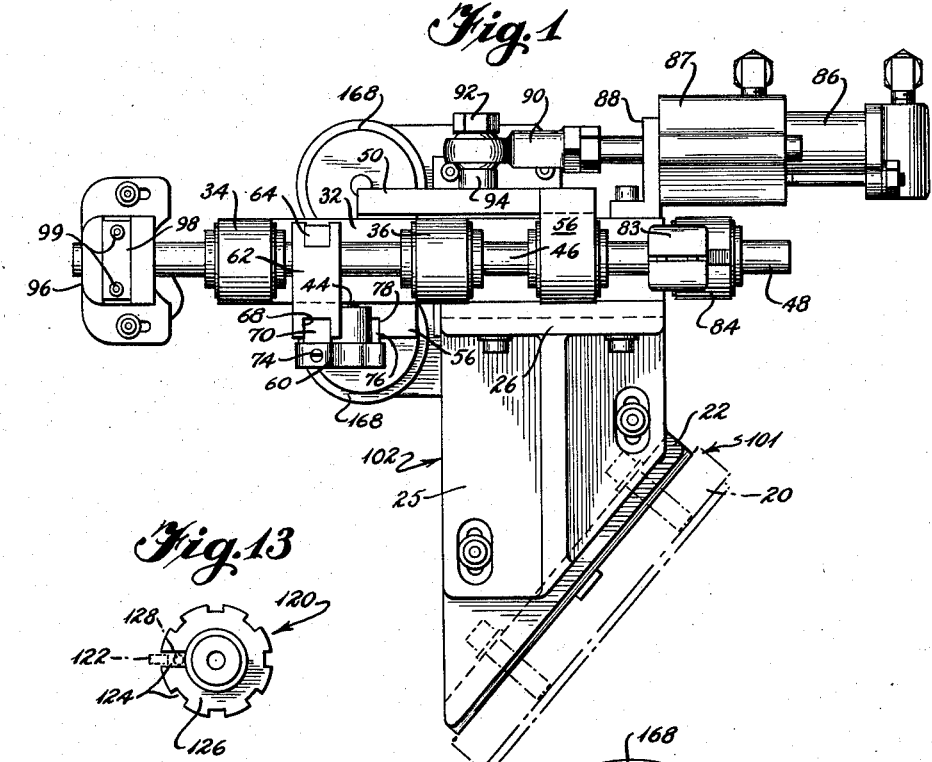
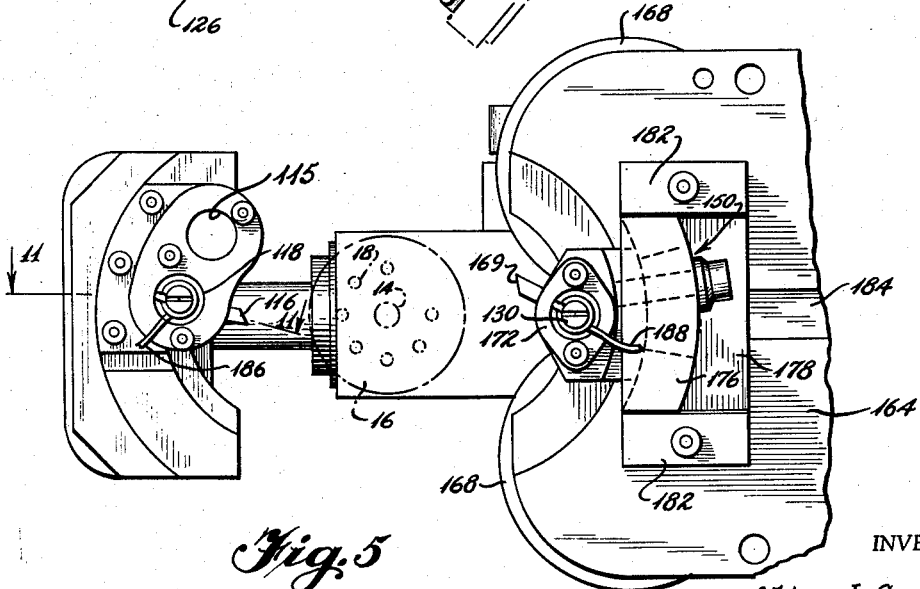
INVENTORS
Alton L. Crosby
Kennith M. Stoll
BY Michael Hertz
ATTORNEY

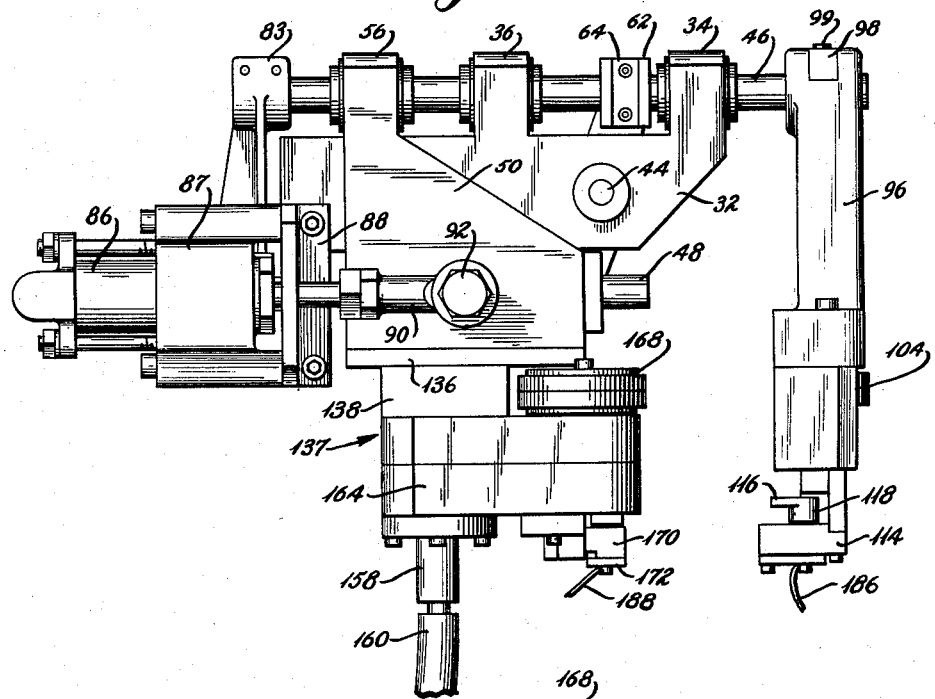
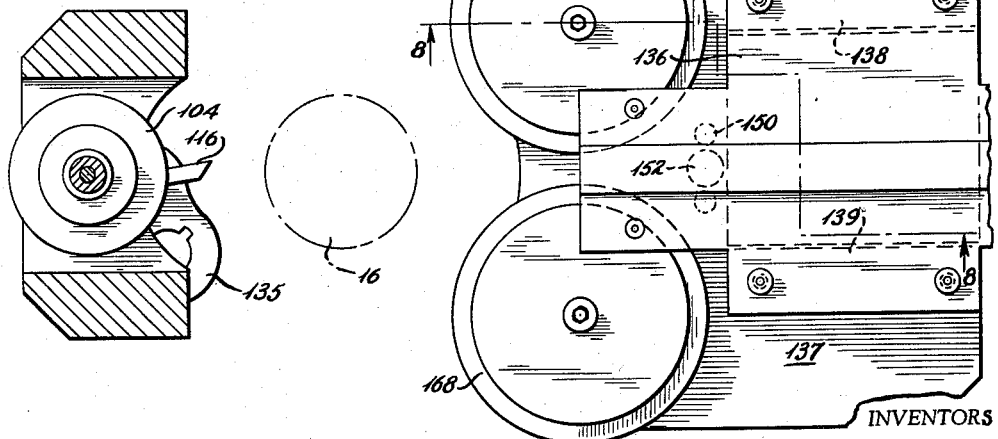

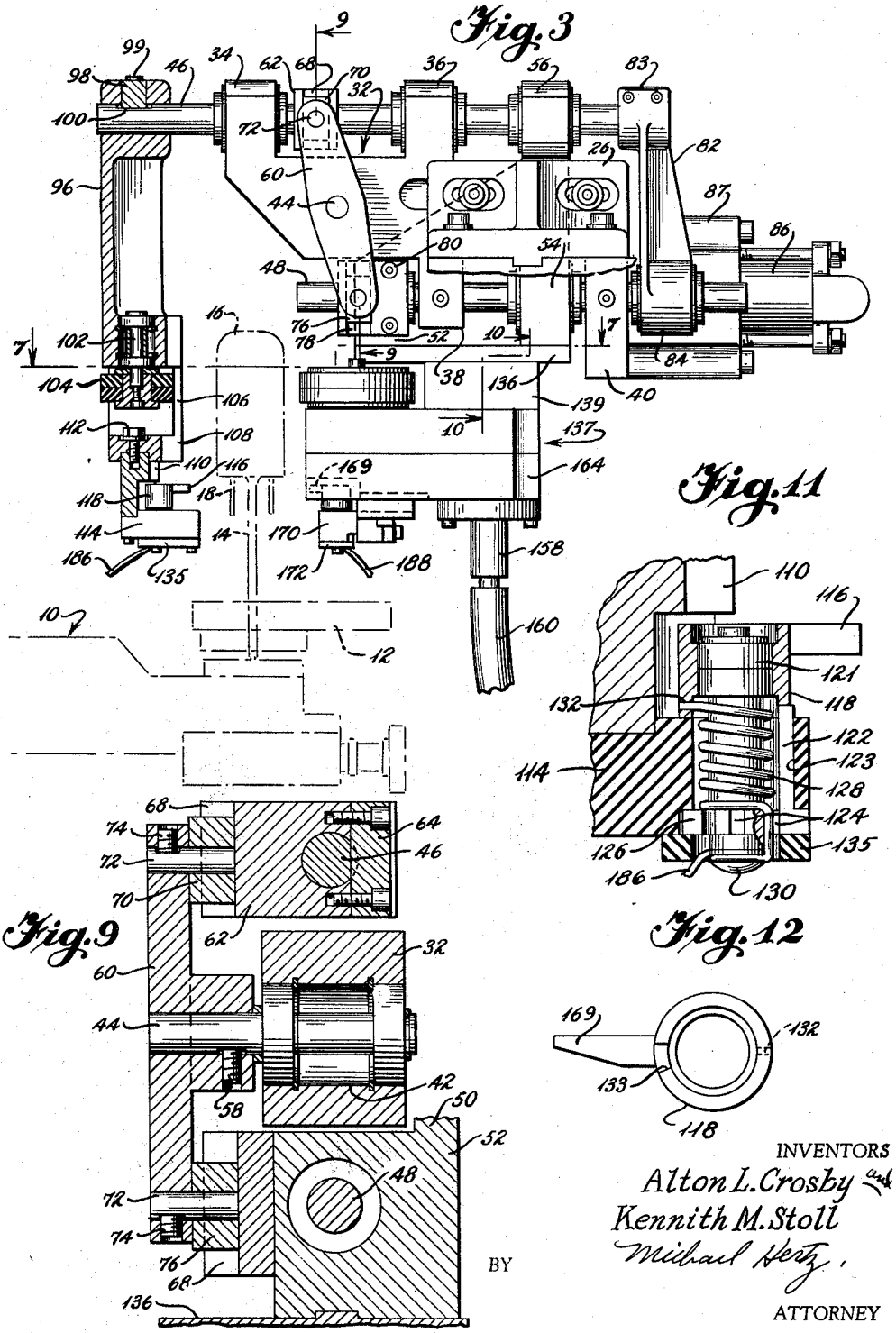

July 5, 1960 A. L. CROSBY ET AL 2,943,723
TUBE-ORIENTATOR
Filed April 21, 1958 5 Sheets-Sheet 4
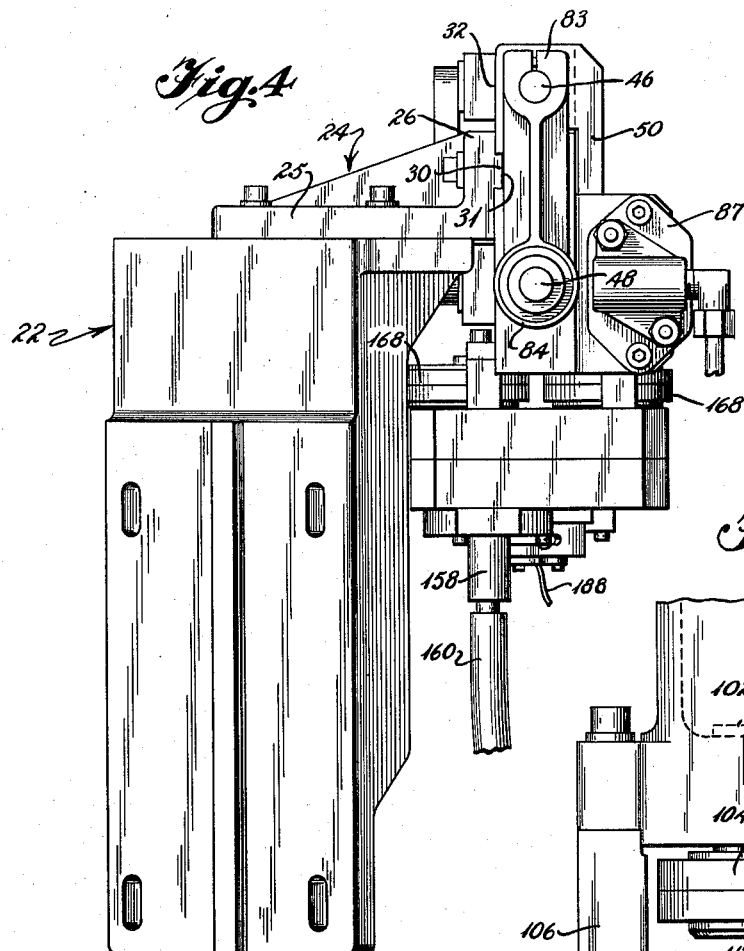
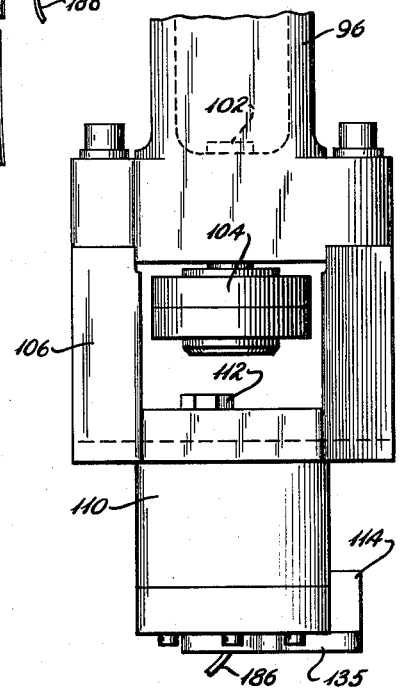
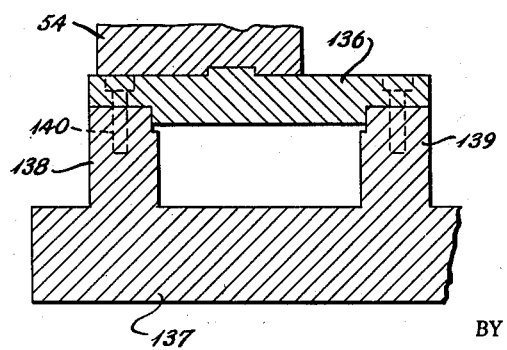
INVENTORS
Alton L. Crosby and
Kennith M. Stoll
BY Michael Hertz
ATTORNEY

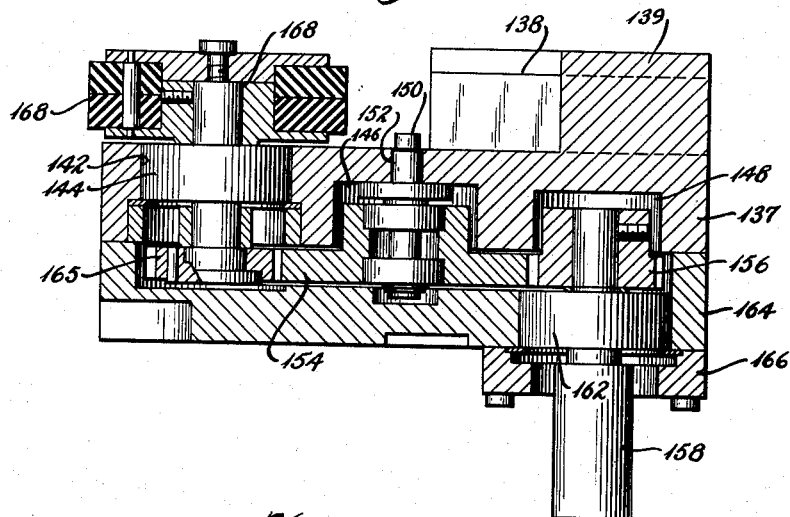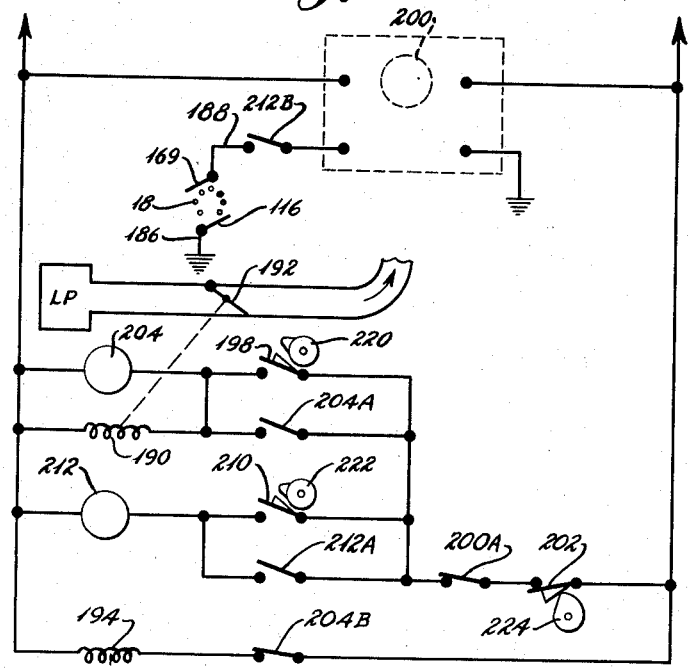

United States Patent Office 2,943,723
Patented July 5, 1960

2,943,723
TUBE-ORIENTATOR

Alton L. Crosby, Austin, and Kenneth M. Stoll, McKean, Pa., assignors, by mesne assignments, to Sylvania Electric Products Inc., Wilmington, Del., a corporation of Delaware Filed Apr. 21, 1958, Ser. No. 729,944

5 Claims. (Cl. 198—33)

This invention relates to an orientating mechanism for use with cylindrical articles having a conductive medium therewithin and leading to two spaced apart conductive leads.

In the ensuing description and in the accompanying drawings, the orientating mechanism of the invention, for the purposes of illustration, has been described and illustrated in connection with a combined sealing and exhausting machine having an indexible turret and known as a Sealex, the machine being utilized in the manufacture of electron tubes to evacuate them, to electrically bombard the elements therewithin so that occluded gases may be driven off, to flash the getter within the tube and to seal or tip it off. For assisting in these operations the electron tube is, during its manufacture, provided with an exhaust tubulation which is removed during the tipping off or sealing of the evacuated tube. During the evacuation and the bombarding operations, the filament is maintained lit to heat the interior of the tube and the electrodes therewithin to facilitate the freeing of gases. Therefore, it is necessary to properly orientate the tube and its leads with respect to contacts in the machine to assure heating of the filament.

In the application of the orientating mechanism here shown, the mechanism rotates a cylindrical bulb having a tubulation which extends into and is rotationally frictionally held in the exhaust port of the Sealex, the rotation continuing until the filament leads of the tube are in proper position relative to the orientating mechanism, the port, and the contacts in the machine. In normal machine operation, as the turret indexes to the next station, the exhaust port is made air tight with the tubulation.

It is the purpose of this invention to provide a mechanism which will approach an article having a conductive element associated with it and upon engagement therewith rotate it until the conductive elements are in a definite angular position relative to the mechanism and to then release the article in its orientated condition.

For a fuller understanding of the invention reference is made to the following description in conjunction with the accompanying drawings in which:

Fig. 1 is a top plan view of the orientator.

Fig. 2 is a side elevation view thereof.

Fig. 3 is a similar view taken from the opposite side of the orientator with parts shown in section and showing in dotted lines, the association of the orientator with the article being rotated in its holder.

Fig. 4 is an end elevation of the orientator.

Fig. 5 is a fragmentary view of the orientator looking up at the contact hanger end of the orientator.

Fig. 6 is a fragmentary end view of a hanger showing a bulb engaging roller carried by the hanger and a contact carrier.

Fig. 7 is a view looking down on the bulb rotating rolls taken substantially on the line 7—7 of Fig. 3.

Fig. 8 is a section through the gear mechanism for driving bulb engaging rollers taken substantially on the line 8—8 of Fig. 7.

Fig. 9 is a section taken along the line 9—9 of Fig. 3.

Fig. 10 is a vertical section taken on the line 10—10 of Fig. 3.

Fig. 11 is a vertical section taken through one of the contacts.

Fig. 12 is a view of one of the contacts and its integral cylinder.

Fig. 13 is a plan view of the stud on which the contact carrying cylinder is rotated and Fig. 14 is a wiring diagram of circuitry involving the contacts which engage the article being rotated.

Now referring to the drawings with greater particularity, at 10 there is indicated the conventional indexible turret of a Sealex machine such as is shown fragmentarily in Regec et al. 2,744,671. The turret has a main shaft (not shown) and a suction port 12 which in the orientating position of the turret rotationally, though frictionally, retains the tubulation 14 extending down from the cylindrical bulb 16 of an electron tube containing within it electrode elements terminating in leads 18, one pair of which is connected to a filament within the tube.

Vertically adjustably secured to a support 20 on the base of the Sealex is a vertical mounting bracket 22 to the upper face of which is mounted an angled support 24, the same being adjustable in a horizontal direction. The angled support has a horizontal web 25, horizontally positionable on the bracket 22, and a vertical flange 26 provided with an integral key 30 to fit in a slot 31 in a combined bearing housing and mounting bracket 32. The vertical flange also is slotted to allow lateral adjustment of the bracket 32 in a horizontal plane. All of the described adjustments provide for positioning of the bracket 32 universally, in any desired direction, to the extent permitted by the slotted members constituting the supports for the bracket 32.

The mounting bracket 32 is a member which is generally elongated in a horizontal direction with two parallel upstanding arms 34 and 36 on its upper face. The arm 34 is adjacent one end of the bracket and the other arm 36 is substantially midway, lengthwise, of the bracket. It is also provided with two parallel downwardly extending arms 38 and 40, with the arm 38 substantially midway of the length of the bracket and the arm 40 at that end of the bracket which is opposite the arm 34. In the bracket there is also a horizontal bearing hole 42 for mounting an oscillatable shaft 44. Within aligned bearings in the upstanding arms 34 and 36 is a slidable shaft 46 and within bores in the lower arms 38 and 40 is immovably secured a second shaft 48 to form a guide shaft for a reciprocatably driven plate 50 having a pair of lower spaced bearings 52 and 54 slidable on the guide shaft. The plate also has an upper bearing 56 embracing and movable with the upper shaft, as will be explained. Fixed on the oscillatable shaft 44, as by a set screw 58, is a lever 60 whose free ends have pivoted sliding connections with the shaft 46 and plate 50, respectively. To provide the connections with shaft 46, a block 62 is slipped over the shaft and held thereto by a clamp key 64 resting in a notch in the shaft, the key being held to the shaft by socket head screws 66. The block has a slideway 68 in which is vertically slidable the slide block 70 in which the upper end of lever 60 is pivoted, as by dowel pin 72. A socket set screw 74 holds the dowel pin in place. The lower end of lever 60 is similarly pivoted to a slide block 76 slidable in a way in a lower slide way 78, this slide way being fixed to the lower bearing 52 by socket head screws 80. Thus reciprocation of plate 50 oscillates lever 60 via slide way 78, and the upper end of the lever reciprocates the shaft 46. Thus the plate 50 and shaft 46 move in opposite directions with respect to each other, the mounting bracket 32, however, remaining stationary.

To additionally support the shaft 46 at an end thereof, there is provided a support arm 82, fixed to the shaft 46 by a split collar 83 having a bearing 84 slidable along the guide shaft 48.

Fluid pressure motor means is provided to drive the plate 50. This comprises an air cylinder 86 supported at one end within a housing 87, in turn supported by an angle bracket 88 fastened to the mounting bracket 32. The piston rod 90 of the cylinder is connected to the plate 50 in any convenient manner, as by a bolt 92 threaded into a boss 94 in the plate. Air under constant lower pressure is supplied to the cylinder behind the piston to drive the piston rod in a direction outwardly of the cylinder. High pressure air is utilized to drive the piston in the opposite direction, as will be explained.

The shiftable shaft 46 and the shiftable plate 50, which it will be remembered move in opposite directions, carry complemental parts which control the rotation of the bulb. To the shaft 46 is fastened a jaw or hanger 96, as by a key 98 in the top of the hanger fastened to the hanger by screws 99, the key engaging a flat 100 on the shaft. Journaled in the lower end of the jaw or hanger is a vertical roller pin 102 supporting in any convenient fashion a duplex silicone rubber idler roller 104 adapted when the shaft 46 is shifted toward the bracket 32 to bring the roller into engagement with the bulb 16 with constant low pressure. Attached to the lower end of the jaw is a generally U-shaped frame 106 with a bight portion 108 which has a part arcuate in a horizontal plane. To the bight portion is fastened an arcuate contact block support 110, slight arcuate adjustment of the support relative to the portion 108 being permitted by reason of a bolt and slot connection indicated at 112. The support 110 has affixed to the underside thereof the insulating contact carrier 114 provided with two holes 115 within either one of which, as determined by the positions of the filament leads 18 of the type of tube being treated, the contact 116 may be mounted. The two hole mounting means and the bolt and slot connection provide for considerable latitude in adjustment of the contact circumferentially of the leads 18 to allow for different types of tubes being handled by the Sealex.

The contact 116 is a hard metal finger secured to a cylinder 118 antifrictionally rotatable on a stud 120 as by a bearing 121 keyed to the carrier by an angled key 122 riding in a key way 123 in the carrier 114 and a selected slot 124 of a collar 126 integral with the stud. An electrically conductive coil spring 128 surrounding the stud and fastened to the lower end of the same by a screw 130 passes through a deeper slot than the others in collar 126 and has its upper end terminating and preferably fastened in a hole 132 in the cylinder 118.

The initial pressure of the spring on the contact finger 116 may be determined by selecting through which one of the slots 124 the key 122 will be inserted. The movement of the contact is limited by the cylinder having a slot 133 cut into its periphery, and by the carrier 114 having its key extending into the slot.

A cover plate 135 preferably of insulating material and with holes to match the possible positions of the stud, is screwed to the insulating carrier.

The first of the complemental parts which engages the bulb has just been described. The second of these parts will now be described. Fastened to the underside of the lower bearings 52 and 54 of the reciprocatable plate 50 is a support plate 136 and suitably fastened to this plate is an upper gear housing 137, the gear housing having ribs 138 and 139 with tapped holes 140 so that the support plate may be attached thereto. There is a pair of bores 142 through the housing, each of which is designed to accommodate a ball bearing 144 suitably held within its bore. The underside of the upper gear housing is provided with recesses 146 and 148 to accommodate gearing which will be described. Fixedly mounted in the recess 146 by screws 150 is an idler shaft 152 and antifrictionally mounted on this shaft is an idler gear 154. The idler gear meshes with a drive gear 156 fixed to the top of a drive shaft 158 in turn fixed to a flexible driving shaft 160 direct coupled to the main drive shaft of the Sealex. The drive shaft is mounted in a lower gear housing 164 which extends beneath and covers the driven roller gears 165 and the idler gear. A ring 166 fastened to the lower gear housing helps to retain the roller bearing 162 in place. To each of the roller gears 165 is pinned a roller shaft 167 mounted in the roller bearing 144 and atop which is fastened a composite silicone rubber drive roller 168.

Mounted on the underside of the lower gear housing is a second contact 169 spring mounted in an insulating carrier 170 in a manner similar to the mounting of contact 116 in its carrier 114. The carrier 170 is provided with a cover 172 to surround the stud 174 carrying the contact. The mounting surface of the carrier is arcuate to allow for adjustability of the contact about the circumference of the leads 18 and is adjustably held in a recess in an arcuate upstanding rib 176 on a support 178, by a bolt and slot connection 180. The support is mounted beneath the lower gear bousing 164 and may be adjustably secured thereto in a direction toward and from the contact 116 by sliding between ways of angled clamp bars 182 and by having a key portion sliding in a keyway 184 beneath the gear housing. The gear housing and parts movable therewith, in effect, constitute a second jaw, cooperating with the first jaw to operate on the article between the jaws. Flexible electric leads 186 and 188 are connected to the two contact fingers by being connected beneath the screws 130 which fasten the ends of the springs to the contact mounting studs, the springs then conducting the current to the contacts.

While constant pressure is being applied to the piston in the motor to effect approach movement of the jaws, contact with the tube leads will direct high pressure air to the opposite face of the piston to effect quick separating movement of the jaws, the low pressure air at this time being cut off.

The control for the supply of air to the two ends of the air motor will now be described.

A solenoid 190 controls a valve 192 in the low pressure line and a solenoid 194 controls a valve 196 in the high pressure line. The solenoid 190 is normally deenergized and the valve 192 is normally closed. On the other hand, the solenoid 194 is normally energized and the valve 196 is normally open. The solenoid 190 is under control of the normally open, momentarily closed, switch 198, the switch being in series with the solenoid 190 and in series with series connected, normally closed relay contact 200A under control of a relay 200 and normally closed switch 202. A normally open relay contact 204A shunts the switch 198.

The solenoid 194 is in series with a normally closed relay contact 204B. A relay coil 204 is in shunt with the solenoid 190 and controls both contacts 204A and 204B. Upon closure of the switch 198 the solenoid 190 is energized, as is also the relay coil 204, thereby closing switch 204A to establish a holding circuit for the coil and solenoid 190 and opening switch 204B to deenergize the solenoid 194. Thus low pressure air only, via valve 192, is admitted to the motor cylinder 86 to effect bulb engagement by the jaws.

Shortly after the switch 198 had been closed, a second switch 210 is closed to allow passage of current through a relay coil 212 which coil effects closure of a holding contact 212A and, in the line 188, a control contact 212B connected with a third relay having the coil 200 previously referred to as controlling the contact 200A. Thus the checking of the position of the bulb is not effective until after the jaws have engaged the bulb. Upon the contacts 116 and 169 engaging the filament leads 18 of the tube being orientated, the relay 200 will be energized, the relay contact 200A opened and the holding circuits for the relay coils 204 and 212 will be deenergized thereby cutting off the low pressure air to the motor cylinder and applying high pressure air in reverse direction to effect jaw separation. After the bulb has been rotated a full 360° the switch 202 is opened to insure retraction of the jaws independently of any operation of the relay contact 200A. This relay contact 200A may not have been opened due to failure of the contacts 116, 169 to complete a circuit through the tube, to absence of a tube or to the failure of a filament therein. The switches 198, 210 and 202 are all under control of cams 220, 222 and 224 which are directly driven from the Sealex with the switches 198 and 210 only momentarily closed by the cams and with the switch 202 maintained closed for at least 360° of rotation of the bulb. The flexible shaft 160 being coupled to the drive shaft of the Sealex and the gearing between the flexible shaft and the driving rollers insure the rotation of the bulb for much more than 360° for an index cycling of the Sealex.

In a modification of the invention, the valve 192 is maintained constantly open so that low pressure fluid is constantly applied to the motors to tend to bring the bulb engaging rollers toward each other. In this case when high pressure fluid is applied to the motor via valve 196, the high pressure overrides the low pressure, and effects separation of the rollers. Smoother operation of parts is obtained by this arrangement.

What is claimed is:

1. A mechanism for orientating an article having external leads and an electrical connection between the leads, said mechanism comprising a fixed support, a pair of jaws mounted on said support for movement toward and from the article, each jaw carrying an article engaging means and a lead contact, one of said articles engaging means being motor driven to effect rotation of the article, an air motor under constant air pressure operative upon the jaws to cause the jaws to engage the article, and means, effective when the contacts on the jaws engage the leads on the article, to overcome the air pressure in the motor to effect a separation of the jaws.

2. A mechanism for orientating an article having external leads and an electrical connection between the leads, said mechanism comprising a fixed support, a shaft slidable in said support, a jaw fixedly carried by said shaft, an article engaging member carried by said jaw, a guide fixedly mounted on said support, a plate slidable on said guide, a second jaw carried by said plate, a lever mounted on said support intermediate of the ends of the lever and operatively connected at each end respectively with said shaft and with said plate, means connected to the plate to drive the same, a backing roller carried by one jaw to engage the article between the jaws, a driving roller carried by the other jaw to engage and rotate the article, means to drive the driving roller, a contact carried by each jaw in position to engage the leads on the article as it is rotated, and means, under control of said contacts, to control the motor to cause it to effect separation of the jaws.

3. A mechanism for orientating an article having a vertical bulb and external leads below the bulb extending parallel to the vertical axis of the bulb arranged in the circumference of a circle and an electrical connection between the leads, said mechanism comprising a fixed support, means movable relative to said fixed support to engage and rotate the article, carriers mounted on said movable means, contacts carried by said carriers, means to adjust said carriers arcuately of the movable means and in a horizontal plane to fix the positions of the contacts relative to the support, and means controlled by the contacts engaging the leads bridged by the connection for effecting the movement of the movable means out of engagement with the article.

4. A machine having a turret, a main drive shaft and indexing means for the turret, ports on the turret for frictionally retaining tubulations of incomplete electron tubes, said tubes each having a bulb, external leads, and a filament connected to a pair of said leads, and tube processing devices associated with the machine, in combination with mechanism for sequentially orientating the bulbs in the ports, said mechanism comprising a fixed support mounted on the machine, bulb rotating means on the fixed support and movable toward and from the bulb, lead engaging means supported by and movable with the bulb rotating means said bulb rotating means being driven from the main drive shaft and capable of rotating the bulb through more than 360° for one index operation of the turret, means connected with the lead engaging means to effect movement of the bulb rotating means away from the bulb and other means, operative after 360° of bulb rotation to effect separation of the bulb rotating means from the bulb.

5. A machine having a turret, a main drive shaft, indexing means for the turret, ports on the turret for frictionally retaining tubulations of incomplete electron tubes, said tubes each having a bulb, external leads, and a filament connected to a pair of said leads, and tube processing devices, in combination with mechanism for sequentially orientating the bulbs in the ports, said mechanism comprising a fixed support, jaws movably mounted on the support, a motor for moving the jaws toward and from the bulb carried by one of the ports and located between the jaws, one of the jaws containing bulb engaging and rotating means, means under control of the main drive shaft for effecting approach movement of the jaws after an indexing movement of the jaws, contacts carried by the jaws for engaging the leads, means under control of the shaft for rendering the circuit to the contacts effective after approach movement of the jaws, means under control of the contacts and the filament in the tube to effect a separating movement of the jaws, and means under control of the drive shaft and prior to an indexing operation of the turret for additionally effecting a separation of the jaws in the event the jaws had not previously separated.

References Cited in the file of this patent
UNITED STATES PATENTS

| | | |
|---|---|---|
| 2,426,433 | Carter | Aug. 26, 1947 |
| 2,683,521 | Reynolds | July 13, 1954 |